United States Patent
Dobson, Jr. et al.

(10) Patent No.: US 7,491,681 B2
(45) Date of Patent: Feb. 17, 2009

(54) VISCOUS OLEAGINOUS FLUIDS AND METHODS OF DRILLING AND SERVICING WELLS THEREWITH

(76) Inventors: James W. Dobson, Jr., 11527 Galliant Ridge La., Houston, TX (US) 77082; Ronald Lee Rock, 919 Mayerweather, Richmond, TX (US) 77469

( * ) Notice: Subject to any disclaimer, the term of this patent is extended or adjusted under 35 U.S.C. 154(b) by 382 days.

(21) Appl. No.: 10/948,041

(22) Filed: Nov. 22, 2004

(65) Prior Publication Data

US 2006/0009364 A1    Jan. 12, 2006

Related U.S. Application Data

(63) Continuation of application No. PCT/US03/10845, filed on Apr. 9, 2003.

(60) Provisional application No. 60/372,954, filed on Apr. 16, 2002.

(51) Int. Cl.
*C09K 8/34* (2006.01)
(52) U.S. Cl. ..................... 507/110; 507/140
(58) Field of Classification Search ............. 507/110, 507/140
See application file for complete search history.

(56) References Cited

U.S. PATENT DOCUMENTS

| | | | |
|---|---|---|---|
| 4,175,042 A | 11/1979 | Mondshine | |
| 4,216,113 A | 8/1980 | Winyall | |
| 5,091,448 A * | 2/1992 | Hostettler et al. | 524/45 |
| 5,616,541 A | 4/1997 | Dobson, Jr. et al. | |
| 5,728,642 A | 3/1998 | Aritsuka et al. | |
| 5,728,652 A | 3/1998 | Dobson, Jr. et al. | |
| 5,804,535 A | 9/1998 | Dobson et al. | |
| 5,881,826 A | 3/1999 | Brookey | |
| 5,942,468 A | 8/1999 | Dobson, Jr. et al. | |
| 5,977,030 A | 11/1999 | House | |
| 6,156,708 A | 12/2000 | Brookey | |
| 6,300,286 B1 | 10/2001 | Dobson, Jr. et al. | |

OTHER PUBLICATIONS

Simetric, http://www.simetric.co.uk/si_liquids.htm, Oct. 2004.*

* cited by examiner

*Primary Examiner*—Kuo-Liang Peng
(74) *Attorney, Agent, or Firm*—Locke Lord Bissell & Liddell LLP

(57) ABSTRACT

The invention provides (1) a method of increasing the thermal stability of an oleaginous liquid containing a high surface area silica viscosifier therein by adding a water soluble biopolymer thereto; and (2) a drilling, completion, workover, or well servicing fluid comprising an oleaginous liquid, a water soluble biopolymer, and a high surface area silica viscosifier. The method and fluid may optionally contain a low molecular weight polar additive preferably having a molecular weight less than about 400 and containing one or more polar groups per molecule selected from the group consisting of hydroxyl, amino, and mixtures thereof.

22 Claims, No Drawings

VISCOUS OLEAGINOUS FLUIDS AND METHODS OF DRILLING AND SERVICING WELLS THEREWITH

This patent application is a continuation application of international application PCT/US03/10845 filed Apr. 9, 2003 which claims priority to U.S. Provisional Patent Application Ser. No. 60/372,954 filed Apr. 16, 2002.

BACKGROUND OF THE INVENTION

The invention relates to oil base well drilling and servicing fluids (completion fluids, workover fluids, sand control fluids, perforating fluids, fracturing fluids, and the like known fluids). In particular, the invention relates to all oil fluids containing a silica viscosifier which are characterized by a high low shear rate viscosity and shear thinning index.

It is well known in the oil and gas drilling and servicing art to employ fluids which exhibit an elevated low shear rate viscosity (hereinafter sometimes referred to as "LSRV") and shear thinning index (hereinafter sometimes referred to as "STI"). See for example the following U.S. patents: Dobson, Jr. et al. U.S. Pat. No. 5,728,642 (heavy brine based fluids); Dobson, Jr. et al. U.S. Pat. No. 5,804,535 (formate brine based fluids); Brookey U.S. Pat. No. 5,881,826 (aqueous aphron-containing fluids); Dobson, Jr. et al. U.S. Pat. No. 5,942,468 (invert (water-in-oil) emulsion based fluids); House U.S. Pat. No. 5,977,030 (water-in-oil emulsions); Brookey et al. U.S. Pat. No. 6,156,708 (oil base aphron-containing fluids); and Dobson, Jr. et al. U.S. Pat. No. 6,300,286 (divalent cation-containing brine base fluids).

It is well known that certain aqueous base biopolymer-containing fluids are shear thinning, exhibiting a high low shear rate viscosity and a low high shear rate viscosity. A near zero shear rate (0.06 to 0.11 $\sec^{-1}$) viscosity provides a numerical value related to the ability of a fluid to suspend particles or cuttings under static conditions. Conversely, viscosity measured at shear rates above 20 $\sec^{-1}$ relates to the hole cleaning capacity of a fluid under annular flow conditions. Such fluids have been eminently successful for use in high angle and horizontal drilling. See for example: (1) "Drill-In Fluids Improve High-Angle Well Production", Supplement to Petroleum Engineer International, March, 1995, p. 5-11; and (2) "Soluble Bridging Particle Drilling System Generates Successful Completions in Unconsolidated Sand Reservoirs", J. Dobson and D. Kayga, presented at the $5^{th}$ International Conference on Horizontal Well Technology, Amsterdam, The Netherlands, Jul. 14-16, 1993.

It is disclosed in Dobson, Jr. et al. U.S. Pat. No. 5,616,541 to utilize an amorphous silica as a viscosifier in calcium- and zinc-containing high density brine fluids. It is disclosed in Dobson, Jr. et al. U.S. Pat. No. 5,728,652 to provide calcium- and zinc-containing brine fluids containing one or more polysaccharide polymer viscosifiers and an amorphous silica viscosifier therein.

It is known that certain oleaginous liquids such as petroleum oils or fractions thereof, or other hydrocarbon liquids, can be viscosified or gelled by the addition thereto of certain silica viscosifiers (or thickeners). Generally an increase in efficiency of the viscosification process and a reduction in the silica concentration can be accomplished by the addition to the fluid of low molecular weight polar organic compounds which can absorb onto the surface of the silica particles forming a bridge there between.

SUMMARY OF THE INVENTION

We have determined that the viscosity of oleaginous base fluids containing a silica viscosifier decrease in viscosity, particularly low shear rate viscosity, upon aging the fluids at elevated temperatures.

Thus it is an object of this invention to provide a method of enhancing the thermal stability of oleaginous base well drilling and servicing fluids containing a silica viscosifier.

It is another object of this invention to provide oleaginous base well drilling and servicing fluids which contain a silica viscosifier which exhibit enhanced thermal stability as indicated by the low shear rate viscosity of the fluid.

These and other objects of the invention which will be apparent to one skilled in the art upon reading this specification are obtained by incorporating into the fluids a water soluble biopolymer in an amount sufficient to increase the thermal stability of the fluids.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives failing within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

Oleaginous liquids suitable for use in the fluids of this invention may be selected from any known oleaginous liquids having a high flash point such as mineral oil, diesel oil, other petroleum fractions, synthetic esters, synthetic ethers, synthetic hydrocarbons such as internal olefins, polyalphaolefins, and the like, and crude oils. Preferred are environmentally acceptable oils with low toxicity.

The amorphous silica viscosifier, as known and accepted in the art, are derived either by a liquid phase or a vapor process. Silica's obtained by the vapor process are called fumed or pyrogenic silicas. Products obtained by the liquid process are categorized as silica gels and precipitated silicas. Thus, there are three distinct types of synthetic silicas on the market:

1. Pyrogenic Silicas

Pyrogenic or fumed silicas are prepared by reacting silicon tetrachloride vapor with oxygen and hydrogen gas at high temperatures. These products have high external surface areas and differ from other silicas (e.g., gels, precipitated silicas) prepared from the liquid phase process. Cabot and DeGussa are two suppliers of pyrogenic silicas.

2. Silica Gels

Silica gels are of two types: hydrogels and aerogels. Hydrogels are prepared by reacting a soluble silicate such as sodium silicate with strong sulfuric acid. The gel is washed salt free, dried, micronized, and then classified. Aerogels are prepared from crude hydrogels by displacing its water content with an alcohol. The alcohol is then recovered by heating the gel in an autoclave.

Aerogels are lighter and fluffier than hydrogels because the shrinkage of the gel structure is avoided during the drying process. Gels have very large surface areas, generally in the range of 300-1,000 m²/g and high porosities. Silica gels are offered, e.g., by W. R. Grace and Company under the trademark "Syloid;" by Monsanto, under the trademark "Santocel;" and by Glidden, under the trademark "Silicron."

3. Precipitated Silicas

Precipitated silicas are produced by the de-stabilization and precipitation of silica from soluble silicate by the addition of a mineral acid and/or acidic gases. The reactants thus include an alkali metal silicate and a mineral acid, such as sulfuric acid or an acidulating agent such as $CO_2$.

When the acidification agent is added to the alkali metal silicate at a certain point during the process, the silica starts precipitating. The addition of the acidification agent is continued until the $M_2O$ of the alkali metal silicate (M being the alkali metal) of the ultimate silica is less than about 1% by weight. Thus, as a general rule, the acidification agent is added to the alkali metal silicate to neutralize the alkali portion bound to the silicate anion. The reaction slurry is filtered and washed free of reaction by-product, which is the alkali metal salt of the acidification agent. The filter cake is dried and milled to obtain a silica of desired degree of fineness.

Silica, to be an effective thickening agent must be of a fine size. By fine size is meant that the silica must be in a particle size range of less than 100 millimicrons. These silica materials may either initially by of this small particle size, or be capable of being easily deaggregated or disintegrated to this small particle size when mixed into the liquid to be thickened. Very useful silica thickeners have generally been produced by pyrogenic techniques. These silicas are the thermal decomposition product of silica tetrachloride. A prime characteristic of these pyrogenic silica materials is that they are loosely aggregated to about a 0.5 to 5 micron size, but which when mixed into a liquid readily deaggregate to less than 100 millimicron sized particles.

Silica thickening agents have also been produced by aerogel processes. Generally these are not as good in thickening liquids as pyrogenic silicas.

U.S. Pat. No. 4,216,113 discloses a modified hydrogel process which produces silica thickening agents of a particle size range of 0.5 to 5 micrometers. It is readily deaggregated under conventional mixing to particle sizes of less than 100 millimicrons. A commercially available precipitated silica viscosifier is HI-SIL T-600, a product of PPG Industries, Inc. It has an average ultimate particle size of 21 millimicrons and an average agglomeration size of 1.6 microns (micrometers).

The pyrogenic, fumed silicas are preferred.

The biopolymer viscosifier useful in the practice of this invention is preferably a *xanthomonas* gum (xanthan gum). *Xanthomonas* gum is available commercially. It is a widely used viscosifier and suspending agent in a variety of fluids, *Xanthomonas* gum can be made by the fermentation of carbohydrate with bacteria of the genus *Xanthomonas*. Representative of these bacteria are *Xanthomonas campestris, Xanthomonas phaseoli, Xanthornonas mulvacearn, Xanthomonas carotoe, Xanthomonas traslucens, Xanthomonas hederae*, and *Xanthornonas papavericoli*. The gum produced by the bacteria *Xanthomonas carnpestris* is preferred for the purpose of this invention. The fermentation usually involves inoculating a fermentable broth containing a carbohydrate, various minerals and a nitrogen yielding compound. A number of modifications in the fermentation procedure and subsequent processing are commercially used. Due to the variety of fermentation techniques and difference in processing operation subsequent to fermentation, different production lots of *xanthomonas* gum will have somewhat different solubility and viscosity properties. *Xanthomonas* gums useful in the practice of the present invention are relatively hydratable *xanthomonas* gums.

The colloid is a polymer containing mannose, glucose, glucuronic acid salts such as potassium glucuronate, sodium glucuronate, or the like, and acetyl radicals. Other *Xanthomonas* bacteria have been found which produce the hydrophilic gum and any of the xanthan gums and their derivatives can be used in this invention. Xanthan gum is a high molecular weight linear polysaccharide that is readily soluble in water to form a viscous fluid.

Other biopolymers prepared by the action of other bacteria, or fungi on appropriate fermentation mediums may be used in the fluids of the present invention provided that they impart the desired synergistic thermally stable rheological characteristics thereto. This can be readily determined by one skilled in the art in accordance with the teachings of this specification.

The term "biopolymer" is intended to mean an excellular polysaccharide of high molecular weight, in excess of 500,000, produced by fermentation of a carbohydrate source by the action of bacteria or fungi. Representative microorganisms are the genus *Xanthomonas, Pseudomonas, Agrobacterium, Arthrobacter, Rhizobium, Alcaligenes, Beijerincka*, and *Sclerotiurm*. A succinoglucan type polysaccharide produced by microorganisms such as NCIB 11592 and NCIB 11883 is commercially available.

The fluids may also optionally contain a low molecular weight polar additive. The low molecular weight polar additives useful in this invention have a molecular weight less than about 400 and contain one or more polar groups per molecule selected from the group consisting of hydroxyl, amino, and mixtures thereof These include alcohols, alkylene glycols, polyalkylene glycols, alkyl ethers of alkylene glycols and polyalkylene glycols, amines, alkylene diamines, polyalkylene polyamines, piperazines, aminoalcohols, and the like. The preferred polar additives have the empirical formula $$HO-C_8H_{2a}-Z$$

where a is an integer from 1 to about 5, and Z is a radical selected from the group consisting of H, and $(OC_bH_{2b})_nOR$, where b is 2, 3, or mixtures thereof n is an integer from 0 to about 3, and R is a radical selected from the group consisting of H, $C_xH_{2x+1}$, and $C_yH_{2y+1}CO$, where x is an integer from 1 to 5, and y is an integer from 1 to 3. Preferably a=2 or 3, and $Z=(OC_bH_{2b})_nOR$. Thus it is preferred that the water soluble hydroxy-containing polar additive contain at least two hydroxyl groups or at least one hydroxyl and at least one ether group or radical within its molecular structure.

The polar additive may serve several functions in the fluids of this invention. The polar additive may serve to scavenge (react with) entrained oxygen in the fluids, and may serve to bond between the surface hydroxyls on the particles of the silica viscosifier.

The fluids of this invention may contain other known functional additives such as fluid loss additives, bridging agents, weight materials, emulsifiers, and other functional materials known in the art.

Exemplary fluid loss additives include: organophilic polyphenolic materials such as certain amine-treated lignites (humic acids), amine-treated lignosulfonates, and the like; organophilic polymers such as styrene butadiene copolymers, amine-treated anionic water soluble polymers, and the like; and gilsonite.

The bridging agents useful in this invention are well known in the art. They are solid, particulate, water soluble salts or acid soluble materials the particles of which have been sized to have a particle size distribution sufficient to seal off the pores of the formations contacted by the well drilling and servicing fluid. The bridging agent must not be appreciably soluble in the liquid used to prepare the fluid. Representative water soluble salts include sodium chloride, potassium chloride, calcium chloride, sodium formate, potassium formate, sodium bromide, potassium bromide, calcium bromide, sodium acetate, potassium acetate, and the like. Representative acid soluble materials include calcium carbonate, dolomite (calcium/magnesium carbonate), iron carbonate, and other carbonates. The preferred bridging agents are sodium chloride and calcium carbonate.

The particle size distribution of the bridging agent must be sufficient to bridge across and seal the pores in the subterranean formation contacted by the fluid. Generally, as disclosed in U.S. Pat. No. 4,175,042, a preferred particle size range is from about 5 microns to about 800 microns with greater than about 5% by weight of the particles being coarser than 44 microns. It has been found, however, that the addition of a supplementary bridging agent having a particle size such that at least 90% of the particles thereof are less than 10 microns and the average particle size is from about 3 to about 5 microns decreases the fluid loss of the fluids of this invention and reduces the concentration of polymer required to impart the desired degree of fluid loss control to the fluids of this invention.

The fluids of this invention can be prepared by mixing together the oleaginous liquid, silica viscosifier, and water soluble biopolymer together with any appropriate liquid/solid mixing device. Preferably the silica is mixed into the oleaginous liquid prior to addition of the biopolymer. The polar additive, if incorporated into the fluids, and any other functional additives are preferably added to the fluids after the silica and biopolymer are incorporated in the fluids.

In the absence of added solids, the fluids of the invention provide relatively solids-free, low density well drilling and servicing fluids. Thus the principles of "clear brine" fluids can be utilized in a non-damaging oleaginous base fluid, and the fluid can be formulated using the crude oil native to the specific producing formation.

The preferred fluids of the invention are characterized as having a LSRV of at least 10,000 centipoise (10 Pa·s). The LSRV for purposes of this invention is obtained using a Brookfield Model LVTDV-I viscometer having a number 2 or 3 spindle at 0.3 revolutions per minute (shear rate of 0.063 sec$^{-1}$). The LSRV is indicative of the suspension properties of the fluid. The larger the LSRV, the better is the suspension of solids in the fluid.

The concentration of silica viscosifier in the fluids is preferably about 1.0 to about 10.0 pounds per 42 gallon barrel of fluid, most preferably from about 3-8 pounds per 42 gallon barrel of the fluid. The concentration of water soluble biopolymer in the fluids is preferably from about 0.25 to about 10 pounds per 42 gallon barrel, most preferably from about 0.5 to about 5 pounds per 42 gallon barrel. The concentration of the optional polar additive is preferably from 0 to about 0.75 gallon per 42 gallon barrel of fluid, most preferably from 0 to about 0.5 gallon per 42 gallon barrel of fluid.

As indicated hereinbefore the novel feature of the invention is the finding that a water soluble biopolymer, which is completely insoluble in an oleaginous liquid and which settles out of an oleaginous liquid when incorporated therein, functions to enhance the thermal stability of oleaginous liquids containing a silica viscosifier therein.

In order to more completely describe the invention, the following nonlimiting examples are given. In these examples and this specification, the following abbreviations may be used: API=American Petroleum Institute; AV=apparent viscosity=½ of the Fann viscometer 600 rpm reading; bbl=42 gallon barrel; lbm/bbl=pounds per barrel; ° C.=degrees Centigrade; kg/m$^3$=kilograms per cubic meter; LSRV =Brookfield low shear viscosity at 0.3 revolutions per minute in centipoise; STI=Shear Thinning Index=LSRV÷AV.

The apparent viscosity was obtained by the procedures set forth in API's Recommended Practice 13B-1.

EXAMPLE

To 350 milliliters (1.0 barrel equivalent) of diesel oil were added 5 grams (5 lb/bbl equivalent) of CAB-O-SIL M5 amorphous fumed silica and mixed five minutes on a Hamilton Beach mixer. Thereafter there were added the amounts of diethyleneglycol and xanthan gum biopolymer (RHODOPOL 23P) set forth in Table 1 and the mixing continued for fifteen minutes. The fluids were then evaluated for LSRV and STI. The fluids were hot rolled for sixteen hours at the temperature set forth in Table 1, cooled to ambient temperature, mixed on a Hamilton Beach mixer, and the LSRV and STI again obtained. The data is set forth in Table 1.

The data indicate the poor thermal stability of the fluids which do not contain the biopolymer and the excellent thermal stability of the fluids containing the biopolymer on thermal aging of the fluids at temperatures up to at least 232.2° C. (450° F.).

When the biopolymer is mixed with diesel oil without the silica viscosifier present, it settles out of the diesel oil and no viscosity is developed.

TABLE 1

Each Fluid Contains 5 lb/bbl (14.27 kg/m3) Pyrogenic Silica And The Indicated Concentrations of Xanthan Gum and Diethyleneglycol Dispersed in Diesel Oil

| Fluid | XG$^{(1)}$ lb/bb | DEG$^{(2)}$ gal/bbl | Initial LSRV | STI | Hot Rolled Temp, ° C. | LSRV | STI |
|---|---|---|---|---|---|---|---|
| A | 0 | 0 | 29,100 | 2007 | 65.5 | 5,000 | — |
| B | 0 | 0.24 | 2,100 | — | — | — | — |
| 1 | 1 | 0.24 | 30,500 | 1794 | 65.5 | 27,000 | 1636 |
| 2 | 1.25 | 0.24 | 40,300 | 2687 | 65.5 | 30,200 | 1726 |
| 3 | 2 | 0.24 | 34,400 | 1976 | 65.5 | 35,800 | 1989 |
| 4 | 1.25 | 0 | 39,200 | 2376 | 65.5 | 45,900 | 2869 |
| 5 | 1.25 | 0.012 | 31,900 | 2279 | 65.5 | 26,900 | 1921 |
| 6 | 1.25 | 0.030 | 30,900 | 2209 | 65.5 | 27,600 | 2044 |
| 7 | 1.25 | 0.060 | 29,400 | 1838 | 65.5 | 31,900 | 1823 |
| 2 | 1.25 | 0.24 | 40,300 | 2687 | 65.5 | 30,200 | 1726 |
| 8 | 1.25 | 0.36 | 35,200 | 2200 | 65.5 | 43,300 | 2624 |
| 9 | 1.25 | 0.48 | 40,000 | 2353 | 65.5 | 42,400 | 2494 |
| 10 | 1.25 | 0.60 | 25,400 | 1881 | 65.5 | 16,100 | 1006 |
| 11 | 1.25 | 1.20 | 18,400 | 1840 | 65.5 | 8,300 | 830 |
| 12 | 1.25 | 0.24 | 46,500 | — | 162.8 | 32,700 | — |
| 13 | 1.25 | 0.24 | 33,800 | — | 204.4 | 54,000 | — |
| 14 | 1.25 | 0.24 | 37,300 | — | 232.2 | 92,000 | — |

$^{(1)}$XG = Xanthan gum;
$^{(2)}$DEG = Diethyleneglycol

What is claimed is:

1. An oleaginous base well drilling and servicing fluid comprising:
an oleaginous base liquid;
a silica viscosifier;
a biopolymer thermal stabilizer, and
a polar additive having the formula

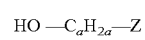

$$HO-C_aH_{2a}-Z$$

wherein a is an integer from 1 to about 5,
Z is a radical selected from the group consisting of H and $(OC_bH_{2b})_nOR$, where b is 2, 3 or mixtures thereof,
n is an integer from 0 to 3, and
R is a radical selected from the group consisting of H, $C_xH_{2x+1}$, and $C_yH_{2y+1}$, wherein x is an integer from 1 to 5 and y is an integer from 1 to 3,
wherein the concentration of silica viscosifier is from about 1.0 to about 10 pounds per 42 gallon barrel of the fluid and the concentration of the biopolymer is from about 0.25 to about 10 pounds per 42 gallon barrel of the fluid, and
wherein the fluid has a low shear rate viscosity (LSRV) of at least 10,000 cP.

2. The fluid of claim 1 wherein the silica viscosifier is a silica selected from the group consisting of fumed silica, silica gels, and precipitated silicas.

3. The fluid of claim 2, wherein the silica viscosifier is a fumed silica.

4. The fluid of claim 2, wherein the silica viscosifier is a silica gel selected from the group consisting of hydrogels and aerogels.

5. The fluid of claim 1 wherein the biopolymer is a xanthan gum.

6. The fluid of claim 5 wherein the silica viscosifier is a fumed silica.

7. The fluid of claim 6 wherein the concentration of silica viscosifier is from about 3 to about 8 pounds per 42 gallon barrel of the fluid and the concentration of the xanthan gum is from about 0.5 to about 5 pounds per 42 gallon barrel of the fluid.

8. The fluid of claim 1 wherein the concentration of silica viscosifier is from about 3 to about 8 pounds per 42 gallon barrel of the fluid and the concentration of the biopolymer is from about 0.5 to about 5 pounds per 42 gallon barrel of the fluid.

9. The fluid of claim 1, wherein the polar additive has a molecular weight less than about 400.

10. The fluid of claim 1, wherein a is the integer 2 or 3 and Z is $(OC_bH_{2b})_nOR$.

11. The fluid of claim 1, wherein the polar additive is diethylene glyco.

12. The fluid of claim 1, wherein the concentration of the polar additive is from about 0.012 gallons to about 0.75 gallons per 42 gallon barrel of the fluid.

13. A method of enhancing the thermal stability of an oleagineous base well drilling and servicing fluid containing a silica viscosifier which comprises:
adding to the fluid a water soluble biopolymer, and
adding a polar additive to the fluid after the silica and biopolymer have been incorporated into the fluid,
wherein the concentration of silica viscosifier is from about 1.0 to about 10 pounds per 42 gallon barrel of the fluid and the concentration of the biopolymer is from about 0.25 to about 10 pounds per 42 gallon barrel of the fluid;
wherein the polar additive has the formula $$HO-C_aH_{2a}-Z$$

wherein a is an integer from 1 to about 5,
Z is a radical selected from the group consisting of H and $(OC_bH_{2b})_nOR$, where b is 2, 3 or mixtures thereof,
n is an integer from 0 to 3, and
R is a radical selected from the group consisting of H, $C_xH_{2x+1}$, and $C_yH_{2y+1}$, wherein x is an integer from 1 to 5 and y is an integer from 1 to 3; and
wherein the resultant fluid has a low shear rate viscosity (LSRV) of at least 10,000 cP.

14. The method of claim 13 wherein the biopolymer is a xanthan gum.

15. The method of claim 14 wherein the silica viscosifier is a fumed silica, the concentration of silica viscosifier is from about 3 to about 8 pounds per 42 gallon barrel of the fluid and the concentration of the xanthan gum is from about 0.5 to about 5 pounds per 42 gallon barrel of the fluid.

16. The method of claim 13 wherein the silica viscosifier is a silica selected from the group consisting of fumed silica, silica gels, and precipitated silica.

17. The method of claim 16, wherein the silica viscosifier is a fumed silica.

18. The method of claim 16, wherein the silica viscosifier is a silica gel selected from the group consisting of hydrogels and aerogels.

19. The method of claim 13, wherein a is the integer 2 or 3 and Z is $(OC_bH_{2b})_nOR$.

20. The method of claim 13, wherein the polar additive is diethylene glycol.

21. The method of claim 13, wherein the concentration of the polar additive is from about 0.012 gallons to about 0.75 gallons per 42 gallon barrel of the fluid.

22. The method of claim 13, wherein the polar additive has a molecular weight less than about 400.

* * * * *

UNITED STATES PATENT AND TRADEMARK OFFICE
CERTIFICATE OF CORRECTION

PATENT NO. : 7,491,681 B2
APPLICATION NO. : 10/948041
DATED : February 17, 2009
INVENTOR(S) : James W. Dobson, Jr.

Page 1 of 1

It is certified that error appears in the above-identified patent and that said Letters Patent is hereby corrected as shown below:

Col. 7; In Claim 11, line 44, the word "glyco" should be changed to "glycol"

Signed and Sealed this

Seventh Day of April, 2009

JOHN DOLL
*Acting Director of the United States Patent and Trademark Office*